United States Patent
Taguchi et al.

(10) Patent No.: US 6,180,751 B1
(45) Date of Patent: Jan. 30, 2001

(54) BIODEGRADABLE ALIPHATIC COPOLYESTER AND METHOD OF PREPARING SAME

(75) Inventors: Yoichi Taguchi, Tsuchiura; Akihiro Oishi, Tsukuba; Yoshikazu Ikeda, Tokyo; Ken-ichi Fujita, Tsukuba; Takashi Masuda, Abiko, all of (JP)

(73) Assignee: Secretary of Agency of Industrial Science and Technology (JP)

( * ) Notice: Under 35 U.S.C. 154(b), the term of this patent shall be extended for 0 days.

(21) Appl. No.: 09/499,518

(22) Filed: Feb. 10, 2000

(30) Foreign Application Priority Data

Mar. 8, 1999 (JP) .................................................. 11-060837

(51) Int. Cl.$^7$ .................................................... C08G 63/48
(52) U.S. Cl. ...................... 528/295.5; 528/272; 528/275; 528/279
(58) Field of Search .................................. 528/272, 275, 528/279, 295.5

(56) References Cited

U.S. PATENT DOCUMENTS 3,875,069 * 4/1975 Worschech et al. .
3,989,728 * 11/1976 Martin .
4,976,953 * 12/1990 Orr et al. ................................ 424/47

* cited by examiner

Primary Examiner—Samuel A. Acquah
(74) Attorney, Agent, or Firm—Lorusso & Loud

(57) ABSTRACT

An aliphatic copolyester having a plurality of first ester units of the formula:

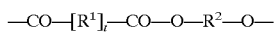

wherein $R^1$ represents a divalent aliphatic group, $R^2$ represents a divalent aliphatic and t is an integer of 0 or 1, and a plurality of second ester units of the formula:

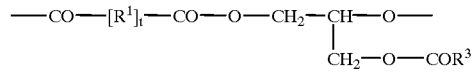

wherein $R^1$ and t are as defined above and $R^3$ represents an aliphatic group. The molar ratio of the first ester unit to the second ester unit is 90:10 to 99.9:0.1. The copolyester is produced by reacting an aliphatic diester with an aliphatic glycol and with a monoacylated glycerin under ester exchanging conditions.

7 Claims, No Drawings

BIODEGRADABLE ALIPHATIC COPOLYESTER AND METHOD OF PREPARING SAME

BACKGROUND OF THE INVENTION

This invention relates to a biodegradable aliphatic copolyester and a method of preparing same.

As biodegradable plastics, aliphatic polyesters are promising. In particular, much attention has been paid on polybutylene succinate or modified products thereof because of their high mechanical strengths and suitable melting point. From the standpoint of industrial application, however, known biodegradable aliphatic polyesters are not fully satisfactory.

SUMMARY OF THE INVENTION

It is an object of the present invention to provide an industrially applicable, biodegradable aliphatic copolyester which has good mechanical strengths and good moldability.

Another object of the present invention is to provide a method which can produce biodegradable aliphatic copolyester in a simple, industrially acceptable manner.

In accomplishing the foregoing object, there is provided in accordance with one aspect of the present invention an aliphatic copolyester comprising a plurality of first ester units each represented by the following formula (I):

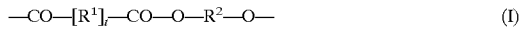

(I)

wherein $R^1$ represents a divalent aliphatic group having 1–12 carbon atoms, $R^2$ represents a divalent aliphatic group having 2–12 carbon atoms and t is an integer of 0 or 1, and a plurality of second ester units each represented by the following formula (II):

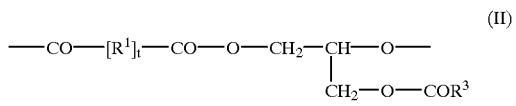

(II)

wherein $R^1$ and t are as defined above and $R^3$ represents an aliphatic group having 6–22 carbon atoms, the molar ratio of said first ester unit to said second ester unit being 90:10 to 99.9:0.1.

In another aspect, the present invention provides a method of preparing an aliphatic copolyester, comprising reacting an aliphatic diester of the following formula (III):

(III)

wherein $R^1$ represents a divalent aliphatic group having 1–12 carbon atoms, $R^4$ and $R^5$ each represent an alkyl group having 1–4 carbon atoms and t is an integer of 0 or 1, with an aliphatic glycol of the following formula (IV)

(IV)

wherein $R^2$ represents a divalent aliphatic group having 2–12 carbon atoms, and with a monoacylated glycerin of the following formula (V):

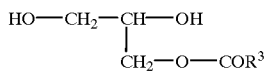

(V)

wherein $R^3$ represents an aliphatic group having 6–22 carbon atoms, said aliphatic glycol and said monoacylated glycerin being used in amounts of 90–110 moles and 0.05–10 moles, respectively, per 100 moles of said aliphatic diester.

The present invention also provides an aliphatic copolyester obtained by the above method.

Other objects, features and advantages of the present invention will become apparent from the detailed description of the preferred embodiments to follow.

DETAILED DESCRIPTION OF THE PREFERRED EMBODIMENTS OF THE INVENTION

The copolyester according to the present invention has first and second ester units. In the first ester unit of the formula (I):

(I)

$R^1$ represents a linear or cyclic divalent aliphatic group, such as an alkylene, having 1–12 carbon atoms, preferably 2–6 carbon atoms. Examples of the divalent aliphatic groups include methylene, ethylene, propylene, butylene, hexylene, octylene, dodecylene, cyclohexylene and cyclohesanedimethylene. The symbol t is an integer of 0 or 1. When t is 0, the first ester unit is represented by

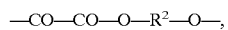, and when t is 1, the first ester unit is represented by

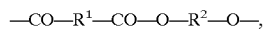,

The symbol $R^2$ of the formula (I) represents a linear or cyclic divalent aliphatic group, such as an alkylene, having 2–12 carbon atoms, preferably 2–6 carbon atoms. Examples of the divalent aliphatic groups include methylene, ethylene, propylene, butylene, hexylene, octylene, dodecylene, cyclohexylene and cyclohexanedimethylene.

In the second ester unit of the formula (II):

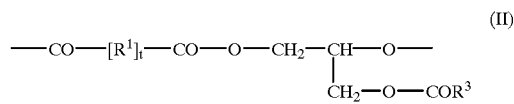

(II)

$R^1$ and t have the same meaning as above. The symbol $R^3$ represents a linear or cyclic aliphatic group, such as an alkyl or alkenyl, having 6–22 carbon atoms, preferably 8–18 carbon atoms. Examples of the aliphatic groups include hexyl, octyl, nonyl, decyl, dodecyl, lauryl, stearyl, behenyl, dodecenyl, cyclohexylene and cyclohexanedimethylene. The particularly preferred aliphatic groups are those derived from natural fatty acids.

It is important that the molar ratio of the first ester unit to the second ester unit should be 90:10 to 99.9:0.1. When the molar ratio is smaller than 90:10, namely when the molar fraction of the second ester unit is greater than 0.1, the copolyester becomes brittle and easily gelled. On the other hand, when the molar ratio is greater than 99.9/0.1, namely when the molar fraction of the second ester unit is smaller than 0.001, the copolyester fails to exhibit satisfactory mechanical strengths. The second ester units are present in the copolyester at random.

The aliphatic copolyester of the present invention generally has a number average molecular weight of at least 10,000, preferably at least 30,000. The upper limit of the number average molecular weight is generally about 1,000,000.

The aliphatic copolyester may be produced by reacting an aliphatic diester of the following formula (III):

with an aliphatic glycol of the formula (IV):

HO—$R^2$—OH      (IV)

and with a monoacylated glycerin of the formula (V):

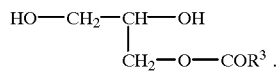

The aliphatic diester of the formula (III) may be, for example, a dialkyl ester, such as dimethyl ester, diethyl ester, dipropyl ester or dibutyl ester, of an aliphatic dicarboxylic acid such as succinic acid, adipic acid, suberic acid, sebacic acid or dodecanedicarboxylic acid.

The aliphatic glycol of the formula (IV) may be, for example, ethylene glycol, propylene glycol, 1,4-butanediol, 1,6-hexanediol, 1,4-cyclohexanedimethanol, polyethylene glycol or polypropylene glycol. The aliphatic glycol is generally used in an amount of 90–110 moles, preferably 95–105 moles, per 100 moles of the aliphatic diester.

The monoacylated glycerin of the formula (V) may be obtained by reaction of glycerin with a saturated or unsaturated fatty acid $R^3$COOH in which $R^3$ is an aliphatic group having 6–22 carbon atoms, preferably 12–18 carbon atoms. Illustrative of suitable aliphatic acids are caproic acid, caprylic acid, lauric acid, myristic acid, stearic acid, behenic acid, oleic acid, erucic acid, linoleic acid, linolenic acid and arachidonic acid. The monoacylated glycerin is generally used in an amount of 0.05–10 moles, preferably 0.1–5 moles, per 100 moles of the aliphatic diester.

The reaction, namely condensation, of the aliphatic diester, aliphatic glycol and monoacylated glycerin is preferably carried out in the presence of a conventional ester exchange catalyst. The reaction is generally performed at a temperature so that the hydroxyl compounds $R^4$OH and $R^5$OH produced as by-products can exist as a gas in the reaction system. When $R^4$OH and $R^5$OH are each methanol, for example, the reaction is generally performed at 100–300° C., preferably 120–250° C. The reaction pressure is generally under a reduced pressure, an ambient pressure or a pressurized condition of up to 0.5 kg/cm$^2$G. An ambient pressure or a reduced pressure is preferably adopted. It is preferred that the reaction be performed using a reactor equipped with a distillation tower for removing the hydroxyl compounds $R^4$OH and $R^5$OH from the reactor as soon as they are produced.

The reaction may be carried out in two, first and second stages. In the first stage, low molecular weight condensation products having a number average molecular weight of 500–10,000, preferably 1,000–5,000, are formed at a relatively lower temperature but at a temperature sufficient for $R^4$OH and $R^5$OH to exist as a gas. In the second stage, the condensation products are further condensed to form a high molecular weight copolyester having a number average molecular weight of at least 10,000. The second stage is preferably performed at a relatively higher temperature and a lower pressure as compared with the first stage, so that the removal of an aliphatic glycol produced as a by-product is expedited.

The following examples will further illustrate the present invention. The number average molecular weight (Mn) and the weight average molecular weight (Mw) of copolyesters are measured by gel permeation chromatography (GPC) using chloroform as an elution liquid and polystyrene as standard. The melting point and the glass transition point are measured by differential scanning calorimetry (DSC). The thermal decomposition temperature is measured by thermogravimetry. The mechanical strengths are measured with a tensile strength tester.

EXAMPLE 1

Into a 100 ml glass reactor equipped with a stirrer, 26.34 g (0.180 mole) of dimethyl succinate, 16.84 g (0.187 mole) of 1,4-butanediol, 0.248 g (0.905 mmol) of glyceryl α-monolaurate of the formula shown below and 20 μl (0.1 mmol) of titanium tetraisopropoxide were charged. The amount of the monolaurate is 0.5 mole per 100 mole of the dimethyl succinate.

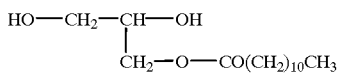

The mixture was reacted at 160° C. in a nitrogen atmosphere for 1 hour, while removing, by distillation, methanol formed in situ. The reaction was further continued at 180° C. for 30 minutes and at 200° C. for another 30 minutes. The temperature was then raised to 215° C. and the reaction was continued at that temperature for 30 minutes while gradually decreasing the pressure. The final pressure at the end of the 30 minutes reaction was 1 mmHg. Then, the reaction was continued for 7 hours at that temperature and at that pressure, thereby obtaining a milky white copolyester having Mn of 70,900, Mw of 667,000, Mw/Mn of 9.41 and a melting point of 114.1° C. The temperature (Td) at which the weight of copolyester had been reduced by 2% by weight was 320° C. The copolyester had a modulus of at least 756 MPa, an upper yield stress of 27.3 Mpa, a rupture stress of 30.2 MPa and a breaking strain of 120%.

COMPARATIVE EXAMPLE 1

Example 1 was repeated in the same manner as described above except that glyceryl monolaurate was not used. Thus, into a 100 ml glass reactor equipped with a stirrer, 26.34 g (0.180 mole) of dimethyl succinate, 16.9 g (0.188 mole) of 1,4-butanediol and 18 μl (0.09 mmol) of titanium tetraisopropoxide were charged. The mixture was reacted at 160° C. in a nitrogen atmosphere for 1 hour, while removing, by distillation, methanol formed in situ. The reaction was further continued at 180° C. for 30 minutes and at 200° C. for another 30 minutes. The temperature was then raised to 215° C. and the reaction was continued at that temperature for 30 minutes while gradually decreasing the pressure. The final pressure at the end of the 30 minutes reaction was 1 mmHg. Then, the reaction was continued for 7 hours at that temperature and at that pressure, thereby obtaining a milky white polyester having Mn of 32,400, Mw of 52,800, Mw/Mn of 1.63, a melting point of 114.1° C. and Td of 322°

C. The polyester had a modulus of at least 459 MPa, an upper yield stress of 26.0 Mpa, a rupture stress of 23.1 MPa and a breaking strain of 119%.

EXAMPLE 2

Example 1 was repeated in the same manner as described above except that the amount of glyceryl monolaurate was increased to 1.0 mole per 100 mole of the dimethyl succinate. Thus, into a 100 ml glass reactor equipped with a stirrer, 26.34 g (0.180 mole) of dimethyl succinate, 16.7 g (0.185 mole) of 1,4-butanediol, 0.498 g (1.81 mmol) of glyceryl α-monolaurate and 18 μl (0.09 mmol) of titanium tetraisopropoxide were charged. The mixture was reacted at 160° C. in a nitrogen atmosphere for 1 hour, while removing, by distillation, methanol formed in situ. The reaction was further continued at 180° C. for 30 minutes and at 200° C. for another 30 minutes. The temperature was then raised to 215° C. and the reaction was continued at that temperature for 30 minutes while gradually decreasing the pressure. The final pressure at the end of the 30 minutes reaction was 1 mmHg. Then, the reaction was continued for 6 hours at that temperature and at that pressure, thereby obtaining a milky white copolyester having Mn of 22,200, Mw of 87,200, Mw/Mn of 3.93, a melting point of 114.9° C. and Td of 309° C. The copolyester had a modulus of at least 479 MPa, an upper yield stress of 25.5 Mpa, a rupture stress of 26.8 MPa and a breaking strain of 124%. The copolyester was found to have the same biodegradability as that of the polyester of Comparative Example 1.

EXAMPLE 3

Example 1 was repeated in the same manner as described above except that the amount of glyceryl monolaurate was decreased to 0.12 mole per 100 mole of the dimethyl succinate. Thus, into a 100 ml glass reactor equipped with a stirrer, 26.34 g (0.180 mole) of dimethyl succinate, 16.84 g (0.187 mole) of 1,4-butanediol, 0.0584 g (0.213 mmol) of glyceryl α-monolaurate and 20 μl (0.1 mmol) of titanium tetraisopropoxide were charged. The mixture was reacted at 160° C. in a nitrogen atmosphere for 1 hour, while removing, by distillation, methanol formed in situ. The reaction was further continued at 180° C. for 30 minutes and at 200° C. for another 30 minutes. The temperature was then raised to 215° C. and the reaction was continued at that temperature for 30 minutes while gradually decreasing the pressure. The final pressure at the end of the 30 minutes reaction was 2 mmHg. Then, the reaction was continued for 7 hours at that temperature and at that pressure, thereby obtaining a milky white copolyester having Mn of 35,000, Mw of 63,000, Mw/Mn of 1.80, a melting point of 114.1° C. and Td of 314° C. The copolyester had a modulus of at least 683 MPa.

EXAMPLE 4

Example 2 was repeated in the same manner as described above except that glyceryl monooleate was substituted for glyceryl monolaurate. Thus, into a 100 ml glass reactor equipped with a stirrer, 26.34 g (0.180 mole) of dimethyl succinate, 16.84 g (0.187 mole) of 1,4-butanediol, 0.647 g (1.81 mmol) of glyceryl monooleate and 20 μl (0.1 mmol) of titanium tetraisopropoxide were charged. The amount of the monooleate is 1.0 mole per 100 mole of the succinate. The mixture was reacted at 160° C. in a nitrogen atmosphere for 1 hour, while removing, by distillation, methanol formed in situ. The reaction was further continued at 180° C. for 30 minutes and at 200° C. for another 30 minutes. The temperature was then raised to 215° C. and the reaction was continued at that temperature for 30 minutes while gradually decreasing the pressure. The final pressure at the end of the 30 minutes reaction was 4 mmHg. Then, the reaction was continued for 7 hours at that temperature and at that pressure, thereby obtaining a milky white copolyester having Mn of 17,200, Mw of 182,000, Mw/Mn of 10.6, a melting point of 114.1° C. and Td of 302° C. The copolyester had a modulus of at least 403 MPa, an upper yield stress of 23.2 Mpa, a rupture stress of 23.9 MPa and a breaking strain of 122%.

EXAMPLE 5

Example 1 was repeated in the same manner as described above except that the amount of the glyceryl monolaurate was increased to 5.0 mole per 100 mole of the dimethyl succinate. Thus, into a 100 ml glass reactor equipped with a stirrer, 26.34 g (0.180 mole) of dimethyl succinate, 16.03 g (0.178 mole) of 1,4-butanediol, 2.472 g (9.01 mmol) of glyceryl α-monolaurate and 208 μl (0.1 mmol) of titanium tetraisopropoxide were charged. The mixture was reacted at 160° C. in a nitrogen atmosphere for 1 hour, while removing, by distillation, methanol formed in situ. The reaction was further continued at 180° C. for 30 minutes and at 200° C. for another 30 minutes. The temperature was then raised to 215° C. and the reaction was continued at that temperature for 30 minutes while gradually decreasing the pressure. The final pressure at the end of the 30 minutes reaction was 1 mmHg. Then, the reaction was continued for 6 hours at that temperature and at that pressure, thereby obtaining a milky white copolyester gel. The copolyester was insoluble in chloroform but was swelled so that 17 g of chloroform was absorbed by 1 g of the copolyester.

The copolyester according to the present invention having a small content of monoacylated glycerin units has improved mechanical strengths such as modulus and good moldability because of a wide molecular weight distribution. When the content of monoacylated glycerin units is relatively high, the copolyester is a gel capable of absorbing a large amount of an organic solvent such as chloroform. The copolyester is biodegradable in nature.

What is claimed is:

1. An aliphatic copolyester comprising a plurality of first ester units each represented by the following formula (I):

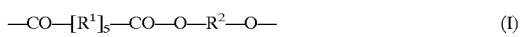

wherein $R^1$ represents a divalent aliphatic group having 1–12 carbon atoms, $R^2$ represents a divalent aliphatic group having 2–12 carbon atoms and t is an integer of 0 or 1, and a plurality of second ester units each represented by the following formula (II):

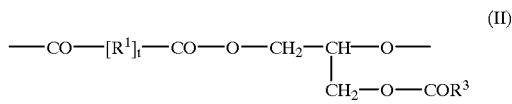

wherein $R^1$ and t are as defined above and $R^3$ represents an aliphatic group having 6-22 carbon atoms, the molar ratio of said first ester unit to said second ester unit being 90:10 to 99.9:0.1.

2. An aliphatic copolyester as claimed in claim 1, and having a number average molecular weight of at least 10,000.

3. An aliphatic copolyester as claimed in claim 1, wherein $R^1$ represents $-CH_2-CH_2-$ and $R^2$ represents $-CH_2-CH_2-CH_2-CH_2-$.

4. An aliphatic copolyester as claimed in claim 1, wherein $R^3$ represents an aliphatic group derived from a natural fatty acid.

5. A method of preparing an aliphatic copolyester, comprising reacting an aliphatic diester of the following formula (III):

$$R^4O-CO-[R^1]_t-CO-OR^5 \qquad (III)$$

wherein $R^1$ represents a divalent aliphatic group having 1–12 carbon atoms, $R^4$ and $R^5$ each represent an alkyl group having 1–4 carbon atoms and t is an integer of 0 or 1, with an aliphatic glycol of the following formula (IV)

$$HO-R^2-OH \qquad (IV)$$

wherein $R^2$ represents a divalent aliphatic group having 2–12 carbon atoms, and with a monoacylated glycerin of the following formula (V):

$$HO-CH_2-\underset{\underset{COR^3}{\overset{|}{O}}}{CH}-OH \qquad (V)$$

$$\phantom{HO-}CH_2-O-COR^3$$

wherein $R^3$ represents an aliphatic group having 6–22 carbon atoms, said aliphatic glycol and said monoacylated glycerin being used in amounts of 90–110 moles and 0.05–10 moles, respectively, per 100 moles of said aliphatic diester.

6. A method as claimed in claim 5, wherein said reaction is performed in the presence of an ester exchange catalyst.

7. An aliphatic copolyester obtained by a method according to claim 6.

* * * * *

UNITED STATES PATENT AND TRADEMARK OFFICE
CERTIFICATE OF CORRECTION

PATENT NO. : 6,180,751 B1
DATED : January 30, 2001
INVENTOR(S) : Taguchi et al.

Page 1 of 1

It is certified that error appears in the above-identified patent and that said Letters Patent is hereby corrected as shown below:

Title page,
ABSTRACT, line 1, "first:" should read -- first --.

Column 2,
Line 25, "–CO–[$R^1$]$_t$–CO–O–R–O–" should read -- –CO–[$R^1$]$_t$–CO–O–$R^2$–O– --.

Column 3,
Line 12, "$R^4$O'CO–[$R^1$]$_t$–CO–OR" should read -- $R^4$O–CO–[$R^1$]$_t$–CO–O$R^5$ --.

Column 6,
Line 19, "-a-monolaurate" should read -- α-monolaurate --; and
Line 45, "–CO–[$R^1$]$_5$–CO–O–$R^2$–O–" should read -- –CO–[$R^1$]$_t$–CO–O–$R^2$–O– --.

Signed and Sealed this

Twenty-third Day of April, 2002

Attest:

*Attesting Officer*

JAMES E. ROGAN
*Director of the United States Patent and Trademark Office*